(12) United States Patent
Kumar et al.

(10) Patent No.: US 8,608,532 B2
(45) Date of Patent: Dec. 17, 2013

(54) CLIMATE CONTROL DUCT ARCHITECTURE FOR A VEHICLE

(75) Inventors: Mukesh Kumar, Canton, MI (US); Paul Hoke, Plymouth, MI (US); Mark Doroudian, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 873 days.

(21) Appl. No.: 12/148,833

(22) Filed: Apr. 23, 2008

(65) Prior Publication Data

US 2009/0270022 A1  Oct. 29, 2009

(51) Int. Cl.
*B60H 1/24* (2006.01)
*F24F 7/04* (2006.01)

(52) U.S. Cl.
USPC ............................ 454/141; 454/144; 138/115

(58) Field of Classification Search
USPC ................... 454/141, 144; 296/70; 138/115
IPC ........................................................ B60H 1/24
See application file for complete search history.

(56) References Cited

U.S. PATENT DOCUMENTS

| | | | | |
|---|---|---|---|---|
| 366,323 A | * | 7/1887 | Johnson | 138/114 |
| 1,596,064 A | * | 8/1926 | Mortimer | 454/138 |
| 1,826,922 A | * | 10/1931 | Carr | 296/149 |
| 2,882,809 A | * | 4/1959 | Nelson | 454/144 |
| 3,537,485 A | * | 11/1970 | March | 138/115 |
| 3,568,791 A | * | 3/1971 | Luxton | 181/224 |
| 3,625,258 A | * | 12/1971 | Phelps | 138/115 |
| 3,661,069 A | * | 5/1972 | Grosseau | 454/160 |
| 3,724,357 A | * | 4/1973 | Kavthekar et al. | 454/152 |
| 3,814,314 A | * | 6/1974 | Morden | 237/12.3 B |
| 3,941,157 A | * | 3/1976 | Barnett | 138/115 |
| 4,374,881 A | * | 2/1983 | Hamilton | 138/109 |
| 4,420,016 A | * | 12/1983 | Nichols | 138/103 |
| 4,646,879 A | * | 3/1987 | Mahler et al. | 454/124 |
| 4,807,523 A | * | 2/1989 | Radtke et al. | 454/124 |
| 5,227,585 A | * | 7/1993 | Zen | 138/115 |
| 5,354,114 A | * | 10/1994 | Kelman et al. | 454/127 |
| 5,531,484 A | * | 7/1996 | Kawano | 138/39 |
| 5,564,515 A | * | 10/1996 | Schambre | 454/127 |
| 5,673,964 A | * | 10/1997 | Roan et al. | 454/121 |
| 5,706,170 A | | 1/1998 | Glovatsky et al. | |
| 5,902,181 A | | 5/1999 | Bain | |
| 5,984,774 A | * | 11/1999 | Upham, III | 454/144 |
| 6,071,591 A | | 6/2000 | Dausch | |
| 6,073,987 A | * | 6/2000 | Lindberg et al. | 296/70 |

(Continued)

FOREIGN PATENT DOCUMENTS

| | | | | |
|---|---|---|---|---|
| JP | 08086256 A | * | 4/1996 | |
| JP | 2004-42686 A | * | 2/2004 | |
| JP | 2004042686 A | * | 2/2004 | |

OTHER PUBLICATIONS

JP2004-042686A machine translation, Feb. 12, 2004.*

*Primary Examiner* — Steven B McAllister
*Assistant Examiner* — Phillip E Decker
(74) *Attorney, Agent, or Firm* — Shook Hardy & Bacon LLP

(57) ABSTRACT

A climate control duct architecture having partitions to provide effective distribution of air immediately as it exits the HVAC. By strategic positioning and configuring of the partitions the duct architecture may be tuned to provide maximum console airflow and desired system airflow distribution with a minimum amount of interference to the airflow due to turbulence.

9 Claims, 9 Drawing Sheets

(56) References Cited

U.S. PATENT DOCUMENTS

| | | | |
|---|---|---|---|
| 6,152,522 A * | 11/2000 | Boulay et al. | 296/208 |
| 6,244,335 B1 * | 6/2001 | Nakamura et al. | 454/121 |
| 6,360,782 B1 * | 3/2002 | Yoshitoshi et al. | 138/115 |
| 6,415,851 B1 | 7/2002 | Hall et al. | |
| 6,425,818 B1 * | 7/2002 | Auvity et al. | 454/144 |
| 6,502,897 B2 * | 1/2003 | Neuss et al. | 454/69 |
| 6,508,701 B1 | 1/2003 | Foury et al. | |
| 6,520,849 B1 * | 2/2003 | Greenwald et al. | 454/121 |
| 6,564,831 B1 * | 5/2003 | Sanoner et al. | 138/115 |
| 6,692,130 B1 * | 2/2004 | Snow | 454/141 |
| 6,715,814 B1 | 4/2004 | Hoyle | |
| 6,772,833 B2 * | 8/2004 | Auer et al. | 454/121 |
| 6,773,340 B2 | 8/2004 | Nakagawa et al. | |
| 6,804,360 B1 * | 10/2004 | Misawa et al. | 381/71.5 |
| 6,929,035 B2 * | 8/2005 | Debaisieux et al. | 138/115 |
| 6,955,394 B1 | 10/2005 | Reddig et al. | |
| 6,966,829 B1 | 11/2005 | Hier et al. | |
| 7,044,538 B2 | 5/2006 | Stack | |
| 7,169,036 B2 * | 1/2007 | Tanoi | 454/144 |
| 7,392,663 B2 * | 7/2008 | Kang et al. | 454/121 |
| 7,828,522 B2 * | 11/2010 | Weaver | 415/213.1 |
| 7,967,032 B2 * | 6/2011 | Harada et al. | 138/116 |
| 8,146,706 B2 * | 4/2012 | Katoh et al. | 454/143 |
| 2001/0037836 A1 * | 11/2001 | Yoshitoshi et al. | 138/115 |
| 2002/0160706 A1 * | 10/2002 | Elliot et al. | 454/121 |
| 2003/0157877 A1 * | 8/2003 | Butera et al. | 454/121 |
| 2003/0176159 A1 * | 9/2003 | Nakagawa et al. | 454/144 |
| 2004/0203333 A1 * | 10/2004 | Yeon | 454/121 |
| 2005/0279319 A1 * | 12/2005 | Jessberger et al. | 123/198 E |
| 2006/0172676 A1 * | 8/2006 | Ebner et al. | 454/152 |
| 2007/0128997 A1 * | 6/2007 | Prince et al. | 454/129 |
| 2007/0137832 A1 * | 6/2007 | Wolf et al. | 165/42 |
| 2007/0249278 A1 * | 10/2007 | McClary | 454/141 |
| 2008/0032618 A1 * | 2/2008 | Katoh et al. | 454/143 |
| 2008/0076344 A1 * | 3/2008 | Flowerday | 454/162 |
| 2008/0223471 A1 * | 9/2008 | Guo | 138/115 |
| 2010/0043470 A1 * | 2/2010 | Kang et al. | 454/141 |

* cited by examiner

CLIMATE CONTROL DUCT ARCHITECTURE FOR A VEHICLE

TECHNICAL FIELD

The present invention relates generally to climate control duct systems for vehicles. More particularly, the present invention relates to a climate control duct architecture that includes partitions which provide distribution of air as it exits the HVAC. By strategic positioning and configuring of the partitions the duct architecture may be tuned to provide maximum console airflow and desired distribution across the system with a minimum amount of interference to the airflow due to turbulence.

BACKGROUND OF THE INVENTION

Modern vehicle interiors are provided with climate control systems. Central to the climate control system is the HVAC which produces climatized air for distribution into the interior of the vehicle through a variety of ducts. Known arrangements of ducts in climate control systems include a path to the panel registers and to the console which takes place at a distance away from the air outlet of the HVAC. Essentially such systems build a plenum structure into the ducts where the flow can become disorganized. To provide a proper amount of airflow known systems frequently must rely on on-board auxiliary devices to increase airflow.

Furthermore, the duct architecture is constrained by packaging requirements. In the modern vehicle a greater number of components required for safety and comfort of the occupants are included in and adjacent to the instrument panel while at the same time designs of the instrument panel itself put increased pressure on the designer to engineer appropriate duct work. Accordingly, the package needed for ducts often gets compromised. This, together with the new designs of instrument panels that often have more lay back angles, brings about continuous challenges to climate control designers to engineer systems that deliver acceptable levels of vehicle airflow.

As a consequence, console airflow of known systems often ends up being low and the comfort levels of the rear passengers are often not attained.

Accordingly, as in so many areas of vehicle design, an improved method of providing a more efficient arrangement for providing adequate airflow to all vehicle passengers is desired.

SUMMARY OF THE INVENTION

The present invention represents an advancement in the art of vehicle climate control system duct architecture. The arrangement disclosed herein includes a partitioned duct having an inlet that is fitted to the outlet of the HVAC. The partitioned duct includes two or more air outlets and a like number of air channels formed between the inlet and the air outlets. A dividing wall is formed to separate each of the channels. The dividing wall includes a leading edge that is provided adjacent the outlet of the HVAC. A number of dividing walls may be used based on the number of airflow channels. For example, if there are two airflow channels there will be a dividing wall separating one channel from the other. If there are four airflow channels, then there would be a dividing wall that separates each channel from the adjacent channel.

The partitioned duct may include a base element, a cover element, and an intermediate element situated between the base element and the cover element. The base, cover and intermediate elements may be formed from a molded material.

The arrangement and configuration of the airflow chambers and the dividing wall or walls of the partitioned duct may be adjusted or tuned for maximum airflow and minimum turbulence. The arrangement and configuration of the airflow chambers and the dividing wall or walls could be adapted as required for the number and placement of downstream ducts and vent outlets.

By providing for the distribution of air at the exit of the HVAC the arrangement disclosed herein reduces air turbulence thus increasing airflow through the duct system. This streamlined arrangement virtually eliminates disorganized airflow and the consequential deceleration and acceleration by splitting airflow directed to each outlet at the earliest stage of the airflow path. The arrangement of the present invention provides optimum airflow with minimum energy requirements.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
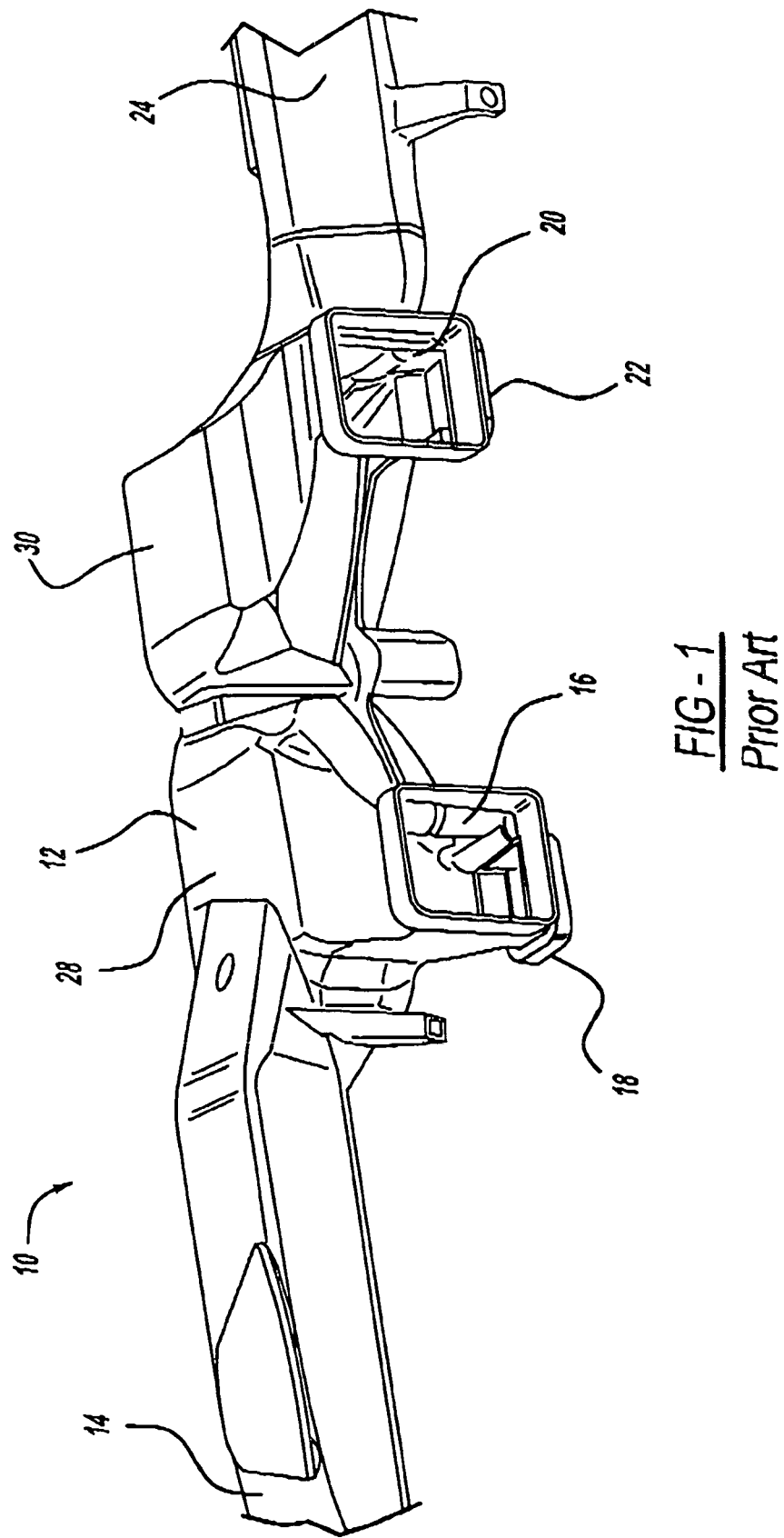
FIG. 1 illustrates a perspective view of an airflow distribution duct of the known art.

In the following figures, the same reference numerals are used to refer to the same components. In the following description, various operating parameters and components are described for one constructed embodiment. These specific parameters and components are included as examples and are not meant to be limiting.

With reference to FIG. 1, a perspective view of an airflow distribution duct according to the known art, generally illustrated as 10, is shown. The airflow distribution duct 10 includes a body 12, a first outlet 14, a second outlet 16, a third outlet 18, a fourth outlet 20, a fifth outlet 22, and a sixth outlet 24. There can be a greater or lesser number of outlets as is known in the art and the arrangement shown is only for illustrative purposes as representing the state of the prior art. Of particular interest is the body 12 which conventionally includes a plenum section for receiving inflowing air coming from the HVAC to which individual outlets 14, 16, 18, 20, 22 and 24 are connected. Conventionally illustrated in FIG. 1 is the body 12 having two plenum volumes, including a first plenum volume 28 and a second plenum volume 30.

Figure 2:
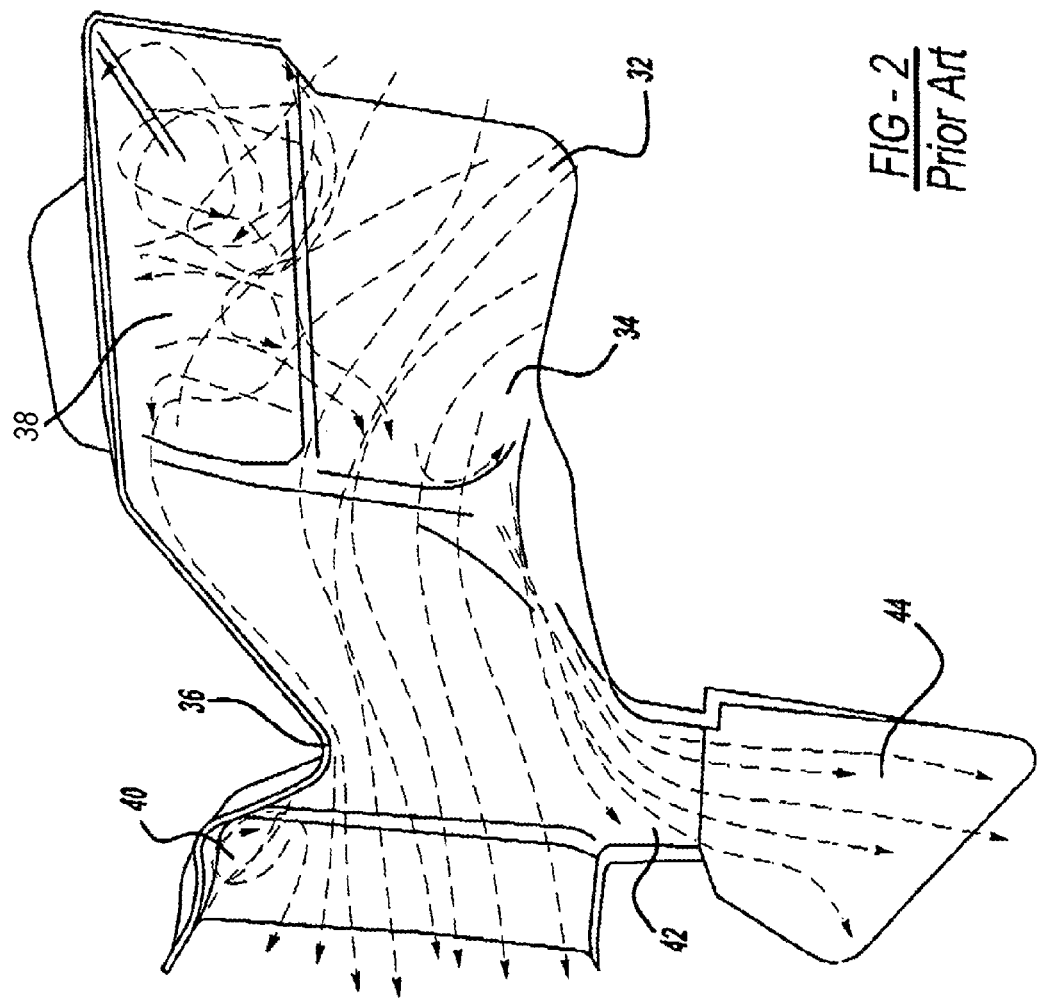
FIG. 2 illustrates a diagrammatic sectional view of the airflow distribution duct of FIG. 1 that illustrates the airflow through the plenum according to known designs in which the airflow is slowed and turbulence is created as illustrated by the airflow lines.

The arrangement of the known art as defined by the plural plenums results in an inefficient way of delivering air to and through the duct system of the vehicle. This is illustrated in FIG. 2 in which a diagrammatic sectional view of the airflow distribution duct 10 of FIG. 1 is illustrated. Typically the airflow distribution duct 10 includes a plenum 32 having an airflow inlet 34. The airflow inlet 34 is fixed to the outlet end of an HVAC (not shown). The airflow distribution duct 10 typically includes one or two restricted areas 36 that restrict air to various outlets to balance the system.

As illustrated in FIG. 2, the reliance of the prior art upon the plenum arrangement results in impeded and turbulent airflow through the airflow distribution duct 10. At the upper end of the airflow distribution duct 10 is an area of relatively low velocity 38 in which a great deal of poorly flowing, turbulent air is shown. Another area of low velocity is in an area of restricted flow 40 that is adjacent the restricted area 36. A third area of low velocity 42 arises where the airflow distribution duct 10 meets a floor outlet 44. The area of low velocity 42 is an area of stagnant air.

The airflow problems shown in FIG. 2 are intended to be illustrative and not limiting but suggest typical airflow problems created in known duct systems that rely upon a plurality of plenums to distribute air to the various airflow outlets. Impeded airflow of the type illustrated results in low velocity of airflow particularly at the most remote outlets of the vehicle climate control system, such as would be found in the rear seat area of a van or of an SUV. Vehicle designers have overcome this problem in part by providing on-board auxiliary airflow devices (not shown) to increase airflow.

Figure 3:
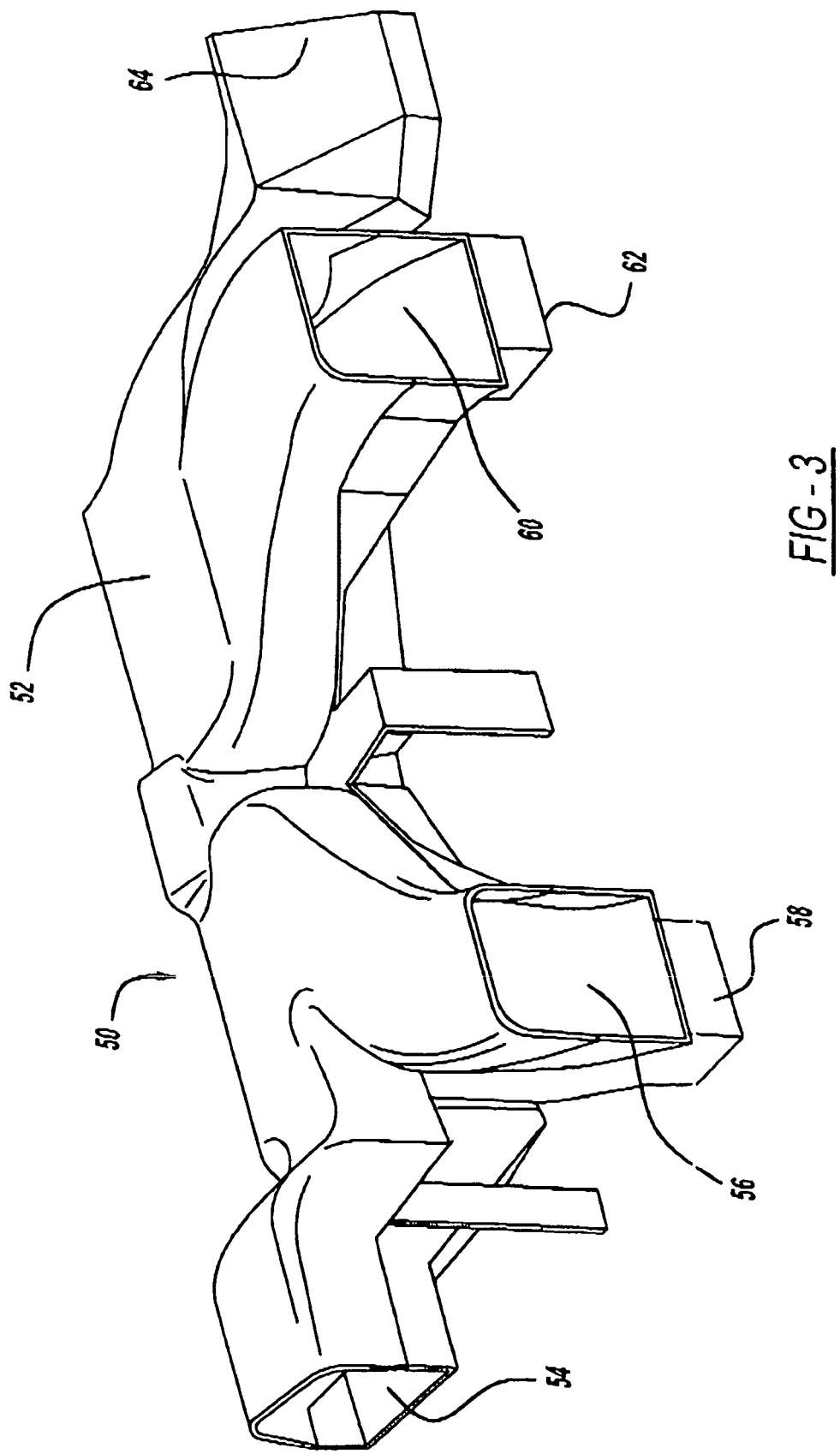
FIG. 3 illustrates a perspective view of a partitioned duct according to the disclosed invention.

The disclosed invention overcomes the limitations of the prior art by providing a tunable partitioned duct, generally illustrated as 50, shown in FIG. 3. The tunable partitioned duct 50 includes a body 52 having a first outlet 54, a second outlet 56, a third outlet 58, a fourth outlet 60, a fifth outlet 62, and a sixth outlet 64. A greater or lesser number of outlets may be provided. The tunable partitioned duct 50 embodies improvements over the prior art that are substantially internal and thus the tunable partitioned duct 50 of the disclosed invention can replace existing airflow distribution ducts of the type shown in FIGS. 1 and 2 and described in relation thereto. Thus capable of being a substituting unit, the remainder of the duct system of the vehicle can be used with the disclosed invention without modification, adding to convenience of design and cost savings.

Figure 4:
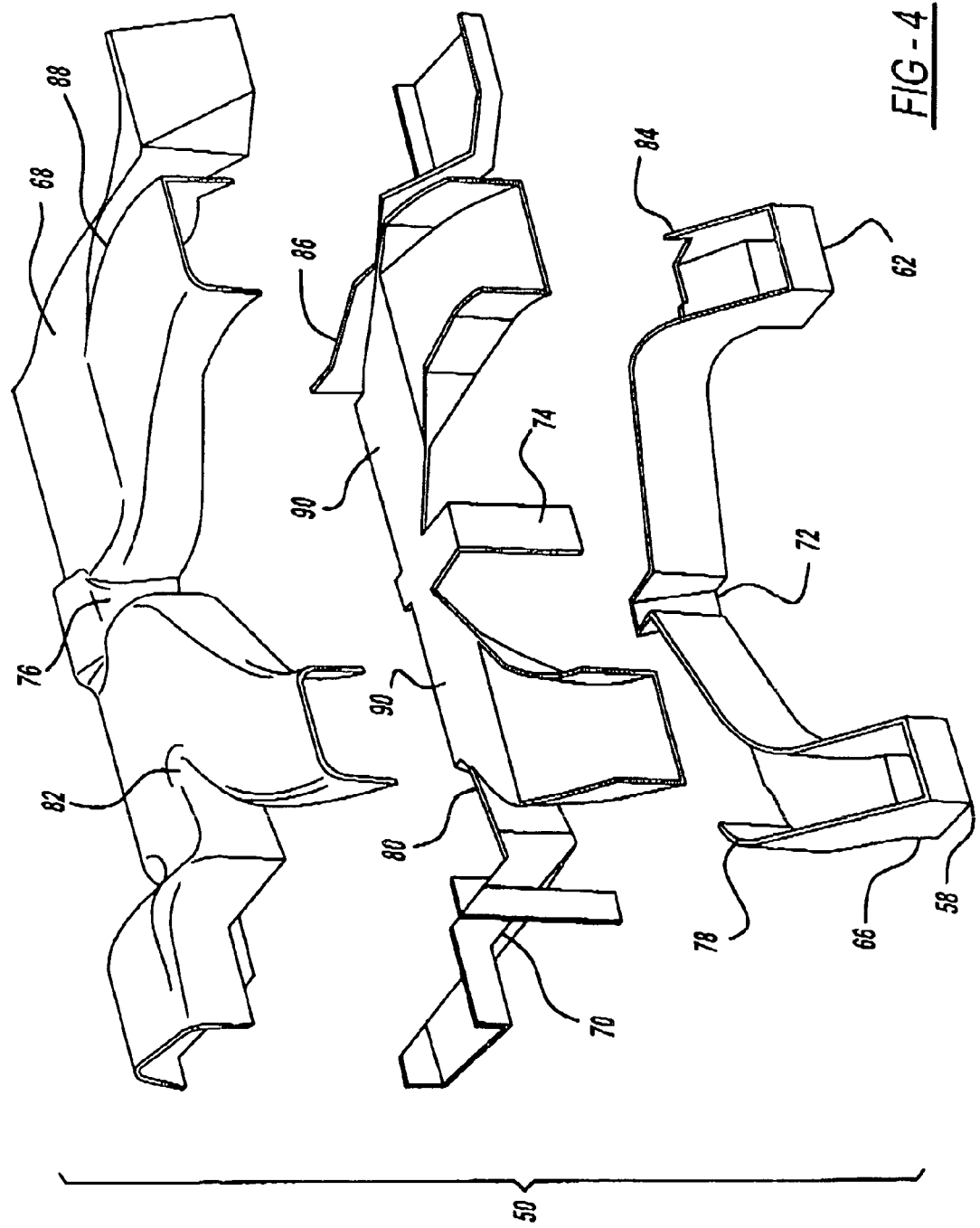
FIG. 4 illustrates an exploded view of the elements of the partitioned duct of FIG. 3.

An exploded view of the tunable partitioned duct 50 of the disclosed invention is shown in FIG. 4. As shown, the tunable partitioned duct 50 preferably but not absolutely is composed of an inlet half 66, a cover half 68, and an intermediate portion 70. One or more of the inlet half 66, the cover half 68, and the intermediate portion 70 may be formed by molding, although it is to be understood that a variety of alternate methods of construction may be utilized.

As illustrated in FIG. 4, a variety of dividing walls are provided to define channels into which flowing air is selectively directed. Centrally provided on the inlet half 66 is a central divider 72. Similarly, a central divider 74 is provided on the intermediate portion 70 while a central divider 76 is provided on the cover half 68. When the inlet half 66, the intermediate portion 70 and the cover half 68 are assembled, the central divider 72, the central divider 74, and the central divider 76 operate as one as a central divider 77 illustrated in FIGS. 6 and 7.

Additional walls are formed in the tunable partitioned duct 50 for directing airflow. Specifically, a right-left divider 78 is formed on the inlet half 66 while a right-left divider 80 is formed on the intermediate portion 70. A right-left divider 82 is formed on the cover half 68. When the inlet half 66, the intermediate portion 70 and the cover half 68 are assembled the right-left divider 78, the right-left divider 80, and the right-left divider 82 operate as one to divide the airflow between the first outlet 54 and the second outlet 56.

In addition to the right-left divider, the tunable partitioned duct 50 of the disclosed invention is fitted with a left-right divider for directing airflow. Specifically, a left-right divider 84 is formed on the inlet half 66 while a left-right divider 86 is formed on the intermediate portion 70. A left divider 88 is formed on the cover half 68. When the inlet half 66, the intermediate portion 70 and the cover half 68 are assembled the left-right divider 84, the left-right divider 86, and the left-right divider 88 operate as one to divide the airflow between the fourth outlet 60 and the sixth outlet 64.

A divider 90 is also provided in the intermediate portion 70 to divide the inflowing air between that air flowing to a first series of air outlets (the first outlet 54, the second outlet 56, the fourth outlet 60, and the sixth outlet 64) and a second series of air outlets (the third outlet 58 and the fifth outlet 62). The divider 90 is also illustrated in FIGS. 6 and 7.

Figure 5:
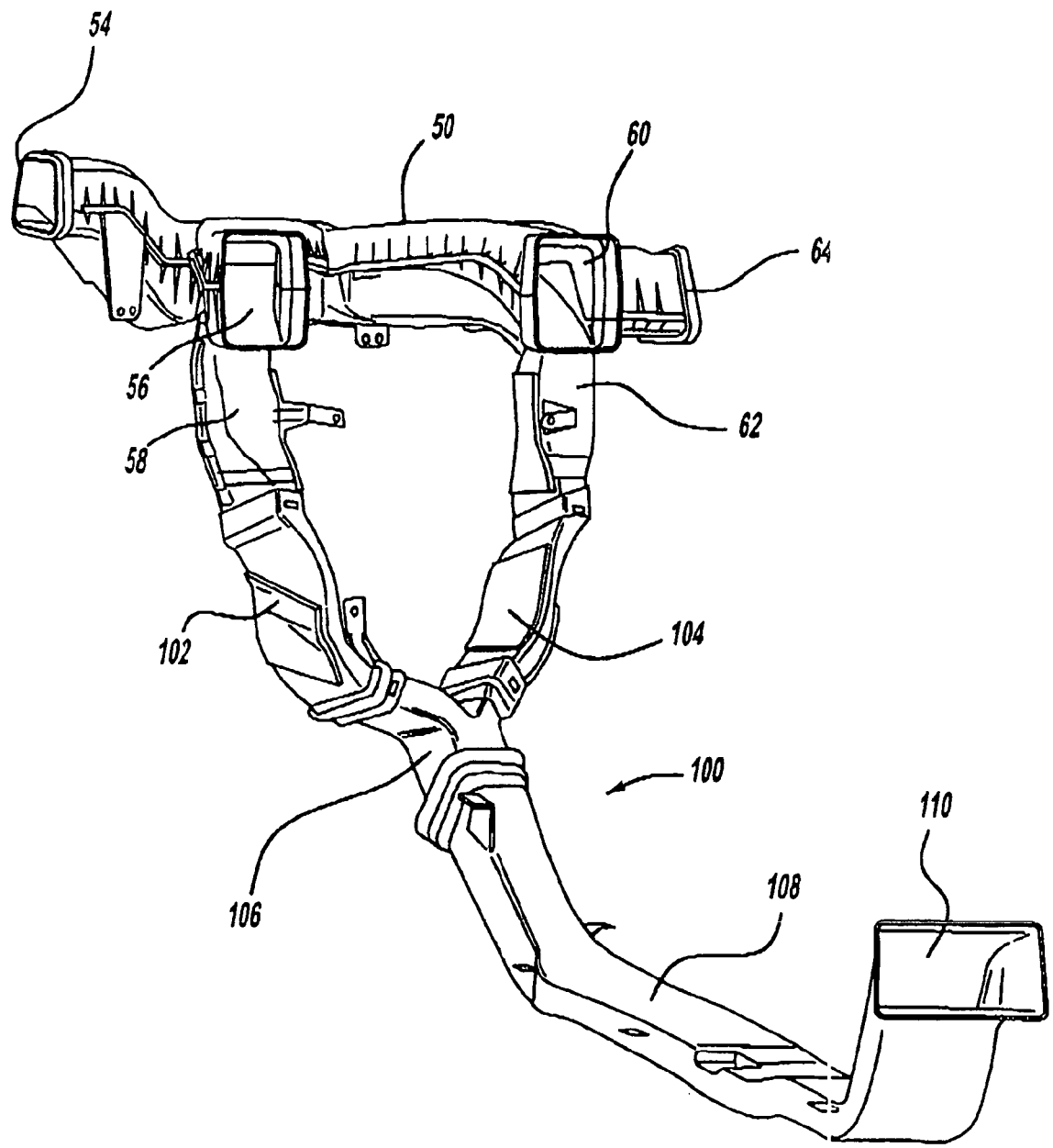
FIG. 5 illustrates a perspective view of a duct system that incorporates the partitioned duct of the disclosed invention.

An exemplary duct system arrangement for a vehicle is shown in FIG. 5 and is generally illustrated as 100. The duct system arrangement 100 includes the tunable partitioned duct 50, two outflow ducts 102 and 104, a distribution duct 106, a rear lead duct 108, and a vent 110. As noted above, the tunable partitioned duct 50 may be utilized with known and existing systems, such as that illustrated in FIG. 5, with no modifications. It is to be understood that the duct system arrangement 100 of FIG. 5 is shown for illustrative purposes only and a wide array of versions and configurations may be adapted as well.

Figure 6:
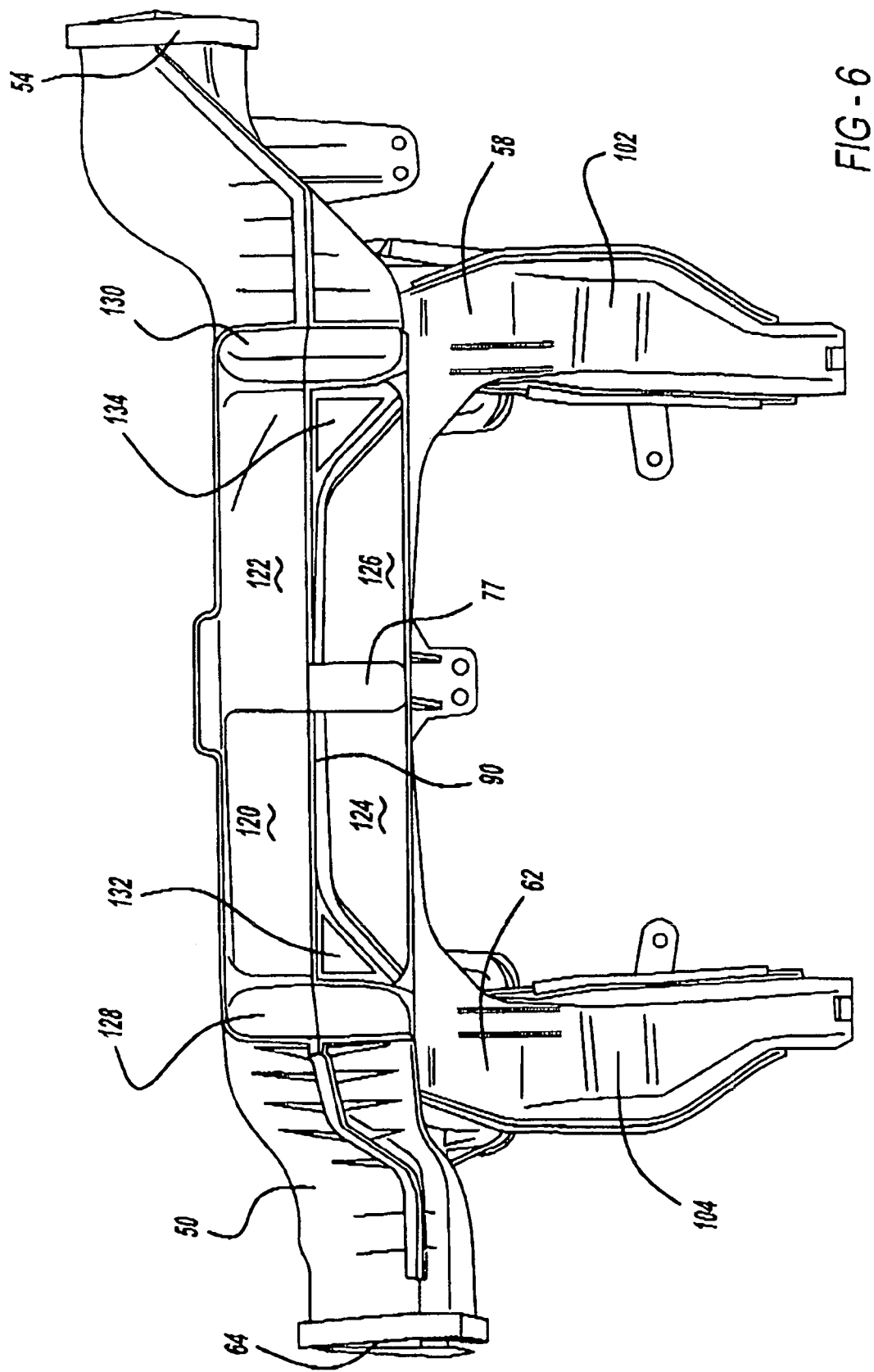
FIG. 6 illustrates a view of the partitioned duct of the disclosed invention taken from its air inlet end.
Figure 7:
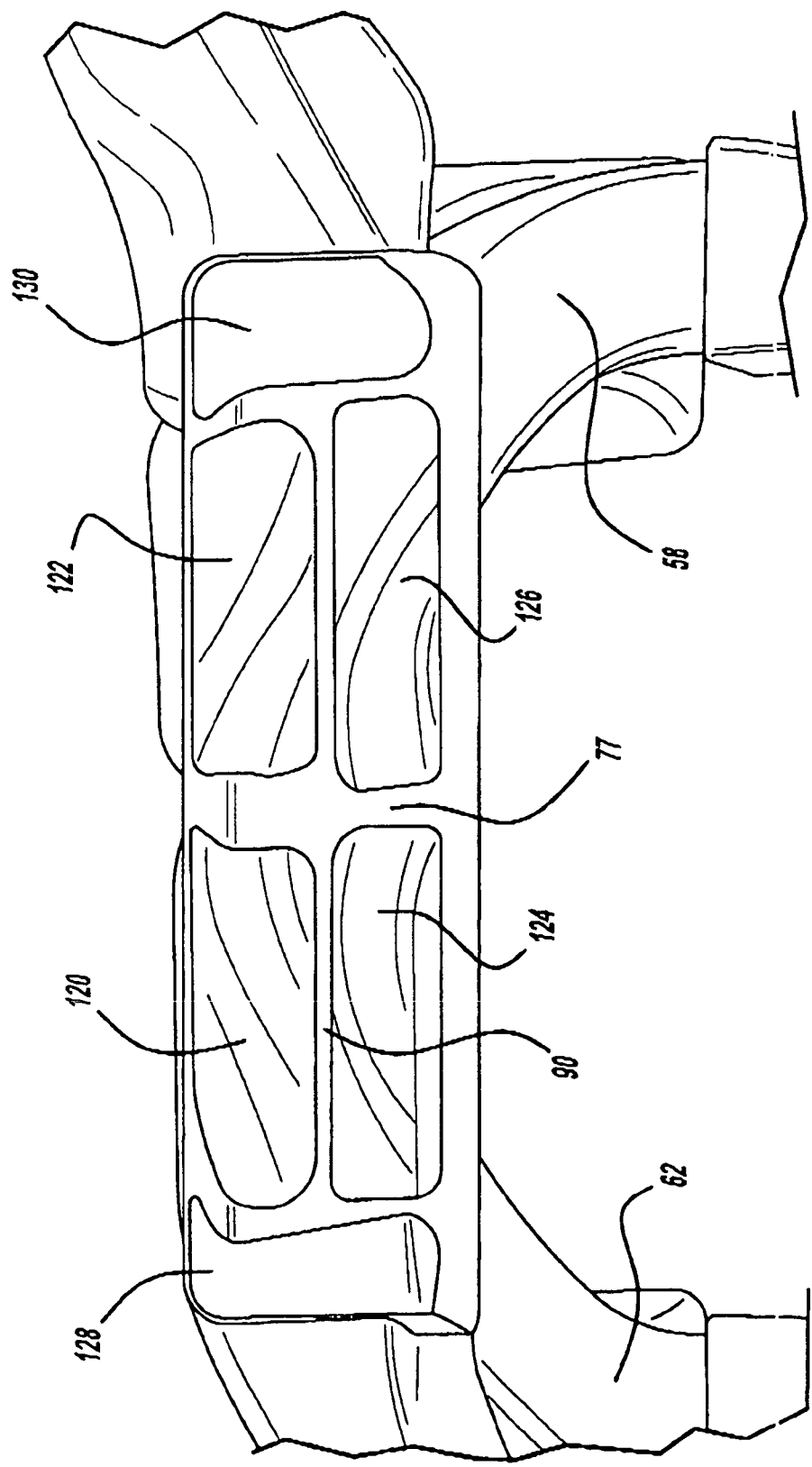
FIG. 7 illustrates a view similar to that of FIG. 6 illustrating the pathways of the individual airflow channels.

FIGS. 6 and 7 illustrate a view of the tunable partitioned duct 50 of the present invention taken from its inlet side. As illustrated, the inlet side is divided into a number of channels by the central divider 77 and the divider 90. The channels include a first airflow channel 120, a second airflow channel 122, a third airflow channel 124, and a fourth airflow channel 126. The first airflow channel 120 is fluidly continuous with the fourth airflow outlet 60, the second airflow channel 120 is fluidly continuous with the second airflow outlet 56, the third airflow channel 124 is fluidly continuous with the fifth airflow outlet 62, and the fourth airflow channel 126 is fluidly continuous with the third airflow outlet 58.

In addition to the first airflow channel 120, the second airflow channel 122, the third airflow channel 124, and the fourth airflow channel 126, a fifth airflow channel 128 is provided in fluid communication with the sixth airflow outlet 64 and a sixth airflow channel 130 is provided in fluid communication with the first airflow outlet 54. Furthermore, and optionally as shown in FIG. 6, a seventh airflow channel 132 and an eighth airflow channel 134 are provided. The seventh airflow channel 132 and the eighth airflow channel 134 may be fluidly associated with, for example, lap coolers (not shown). It is to be understood that a greater or lesser number of airflow channels may be provided. However, regardless of the number of channels, the dividers that define the channels are substantially adjacent with and may abut directly against the outlet of the HVAC.

Figure 8:
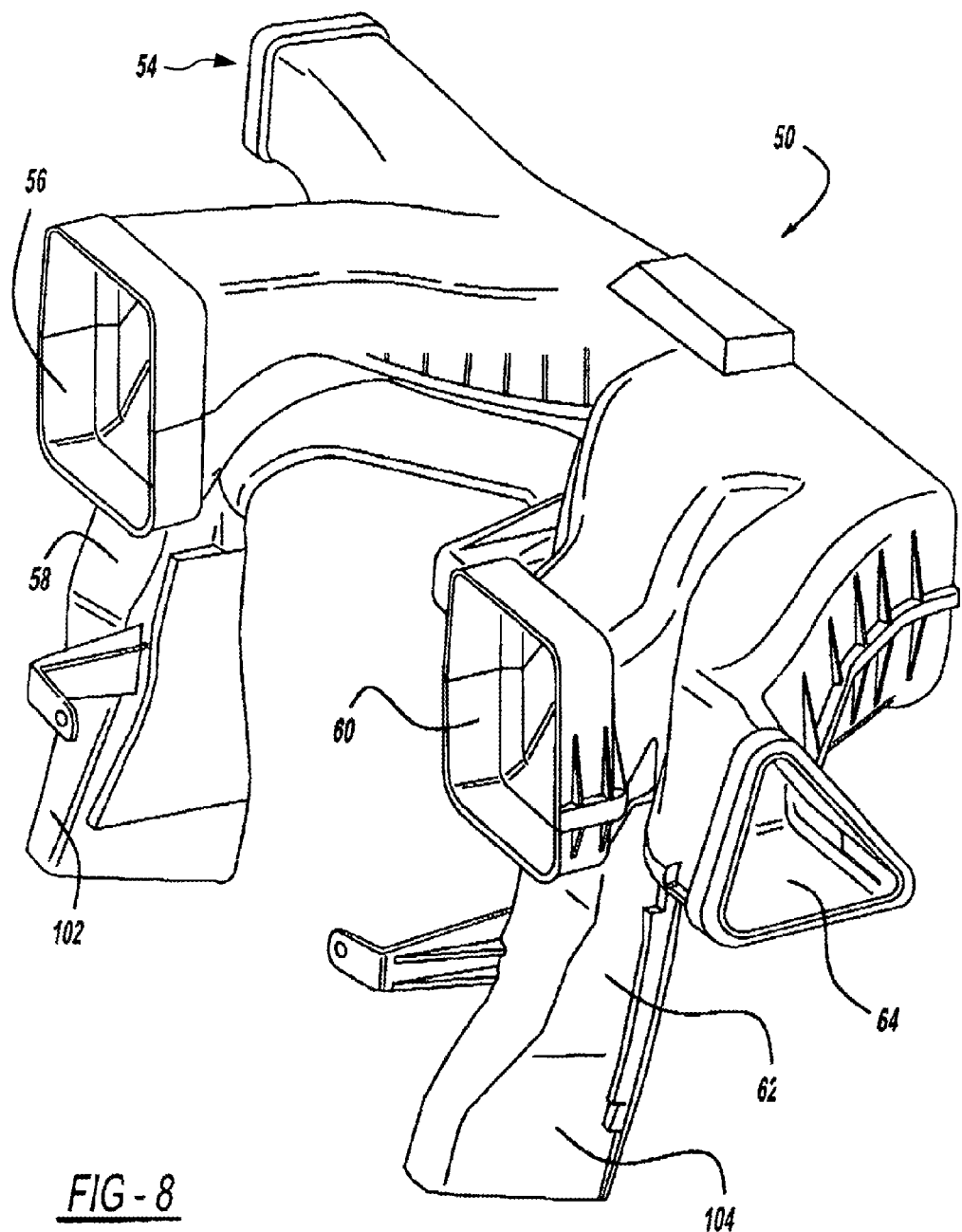
FIG. 8 illustrates an alternate perspective view of the partitioned duct of the disclosed invention.

With respect to FIG. 8, a perspective view of the tunable partitioned duct 50 as disclosed in the present invention is illustrated. The angle of this view differs from the perspective angle shown and described in FIG. 3. This view more clearly shows the sixth airflow outlet 64. In addition, this view illustrates extension ducts 102 and 104 fitted to the third airflow outlet 58 and the fifth airflow outlet 62 respectively. Again, this arrangement can be readily modified as required for adaptation to a particular vehicle arrangement.

Figure 9:
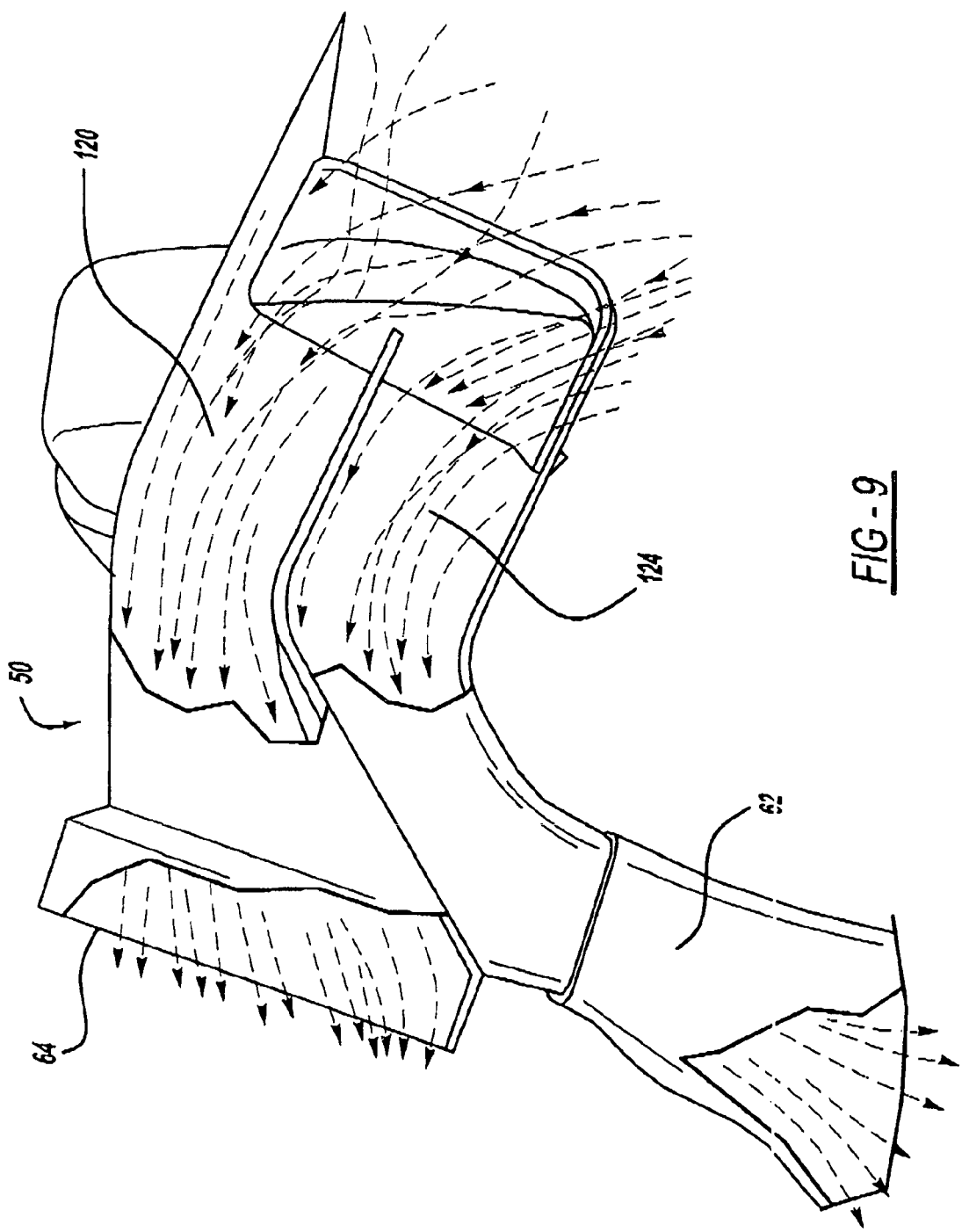
FIG. 9 is a diagrammatic sectional view of the partitioned duct of the disclosed invention illustrating airflow through the duct where the airflow is unimpeded and is virtually void of evidence of turbulence.

The tunable partitioned duct illustrated herein and described above is effective at reducing turbulence and increasing airflow as illustrated in FIG. 9, which is a diagrammatic sectional view of the partitioned duct of the disclosed invention. The airflow through the duct is illustrated. As may be understood by the figure, the airflow is virtually entirely unimpeded and is virtually void of evidence of turbulence. The continuous and clear airflow illustrated by the various and several lines denote high velocity without areas of stagnation or restriction, offering a considerable advantage over the prior art illustrated in FIGS. 1 and 2.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims. Specifically, and as noted above, the variety, position and number of lighting elements provided in conjunction with the floor console can be readily altered to meet the requirements of a specific application without deviating from the present invention.

What is claimed is:

1. A climate control system for a vehicle, the system comprising:
    an HVAC portion having an airflow outlet;
    a partitioned duct portion having an air inlet for substantially mating with said outlet of said HVAC portion, said air inlet having an opening, said partitioned duct portion including:
        a lower cover that forms a bottom wall and side walls of a first airflow channel,
        an intermediate cover that fits onto the lower cover and that forms an intermediate wall, which forms a top wall of the first airflow channel and a bottom wall and side walls of a second airflow channel, and
        an upper cover that fits onto the intermediate cover and that includes an upper wall, which forms a top wall of the second airflow channel, wherein an angled orientation of the intermediate wall directs air through the first airflow channel in a first direction substantially perpendicular to a second direction of the second airflow channel.

2. The climate control system of claim 1, wherein said lower cover, said intermediate cover, and said upper cover are injection-molded components.

3. The climate control system of claim 1, wherein the intermediate cover further comprises a bottom wall of a third airflow channel, and wherein the upper cover further comprises a to wall of the third airflow channel.

4. The climate control system of claim 3, wherein the intermediate cover further comprises a vertically-oriented divider that separates the third airflow channel and the second airflow channel.

5. A climate control system for a vehicle, the system comprising:
    an HVAC portion having an airflow outlet;
    a partitioned duct portion having an airflow inlet for substantially mating with said airflow outlet and comprised of a base element, a cover element, and an intermediate element positionable between the base element and the cover element, the intermediate element including a dividing wall positioned in the partitioned duct that divides the airflow inlet into an upper channel and a lower channel, the upper channel being positioned above the lower channel,
        wherein the dividing wall forms both a bottom wall of the upper channel and a top wall of the lower channel,
        wherein the dividing wall includes a first portion that substantially abuts the airflow outlet of the HVAC portion and that extends generally horizontally between the first channel and the second channel,
        wherein the upper channel diverts air in a first direction and the lower channel diverts air in a second direction that is generally perpendicular to the first direction, and
        wherein the dividing wall includes a second portion that abuts the first portion and that angles downward relative to the first portion, the second portion diverting air in the second direction that is substantially perpendicular to the first direction.

6. The climate control system of claim 5, wherein said base element and said cover element are molded components.

7. The climate control system of claim 6, wherein said intermediate portion is a molded component.

8. A partitioned duct system that provides conditioned air to various areas of a vehicle and that is used with a climate control system having an HVAC, which includes an airflow outlet, the partitioned duct system comprising:
    a first duct and a second duct that extend into respective areas of the vehicle and that distribute conditioned air blown from the HVAC, wherein the first duct directs air in a first direction and the second duct directs air in a second direction substantially perpendicular to the first direction;
    a partitioned plenum that is positioned between the airflow outlet of the HVAC and the first and second ducts and that comprises a base element, a cover element, and an intermediate element positionable between the base element and the cover element, the intermediate element including a dividing wall separating the partitioned plenum into an upper channel and a lower channel
        wherein the first duct connects to the upper channel and the second duct connects to the lower channel, and
        wherein the dividing wall includes a first portion that substantially abuts the airflow outlet of the HVAC portion and that extends generally horizontally between the first channel and the second channel, and
        wherein the dividing wall includes a second portion that abuts the first portion and that angles downward relative to the first portion, the second portion diverting air in the second direction that is substantially perpendicular to the first direction.

9. The partitioned duct of claim 8, wherein the partitioned duct includes an air inlet half, a cover half, and an intermediate component disposed between said air inlet half and said cover half.

* * * * *